Sept. 15, 1970                    J. J. DI PONIO                    3,528,271
                    METHOD FOR ROLLING A RACE FOR A BALL BEARING
Filed Feb. 2, 1968                                        3 Sheets-Sheet 1
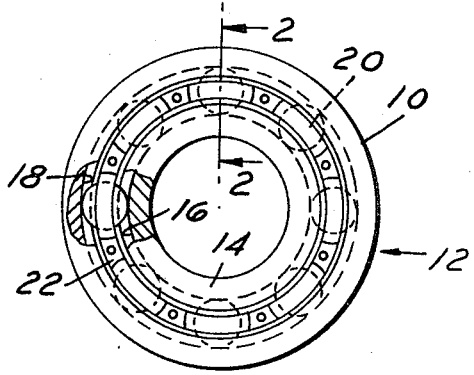
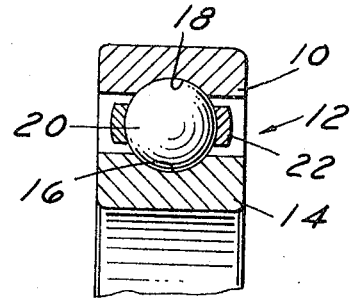
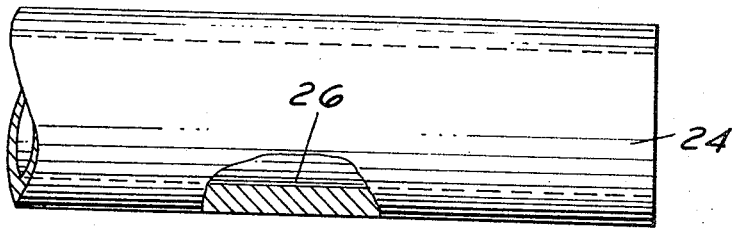
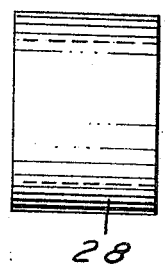
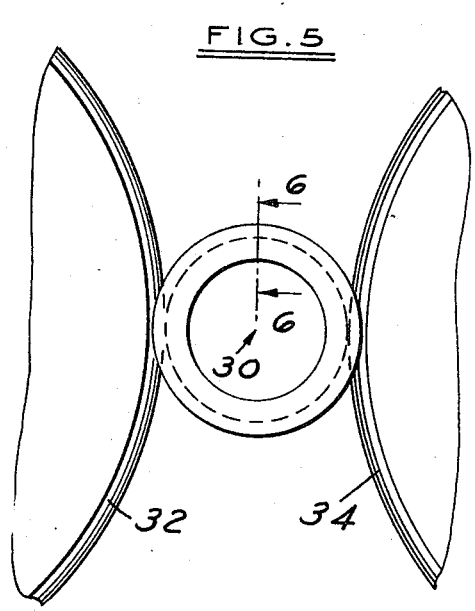
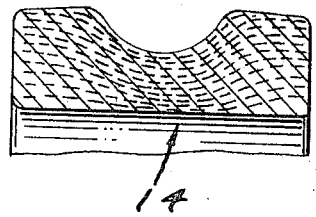
INVENTOR
JOHN J. DI PONIO
BY
John R. Faulkner
Donald J. Harrington
ATTORNEYS

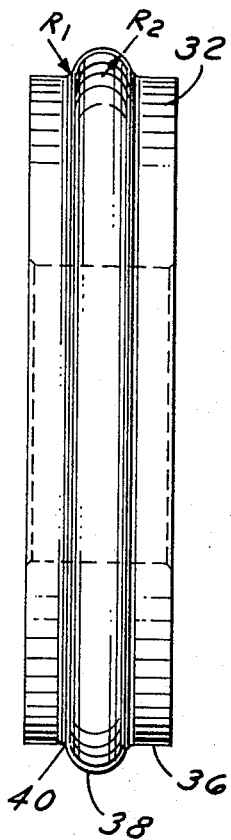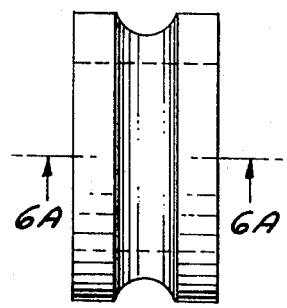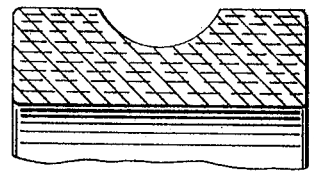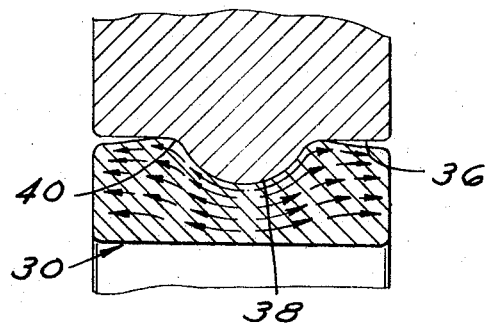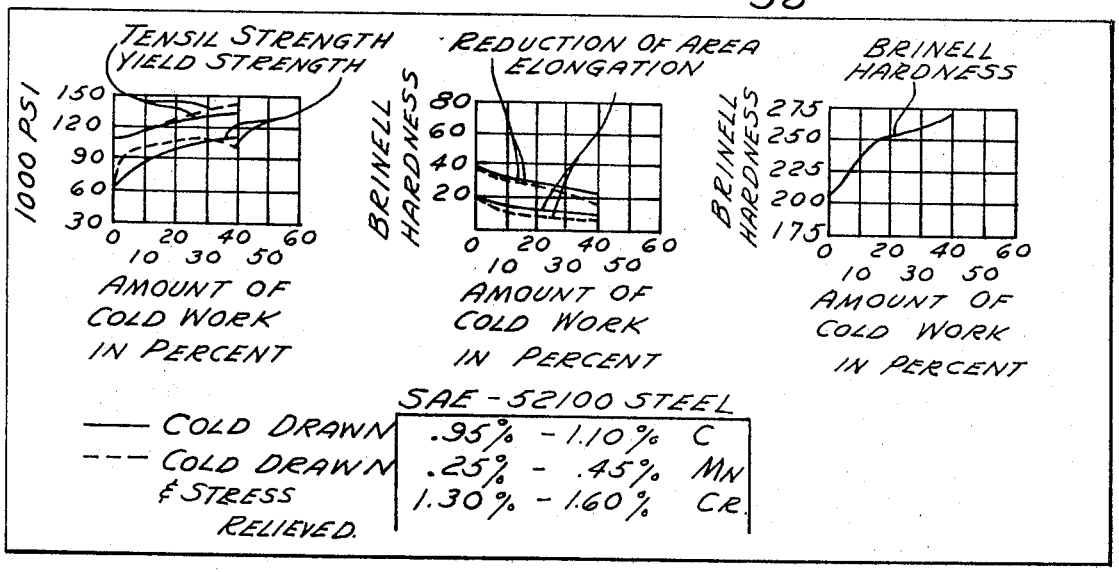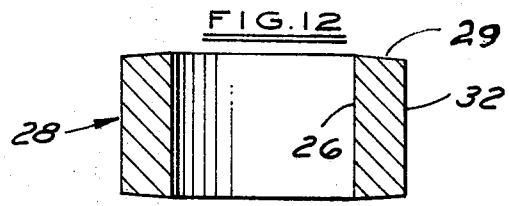

Sept. 15, 1970          J. J. DI PONIO          3,528,271

METHOD FOR ROLLING A RACE FOR A BALL BEARING

Filed Feb. 2, 1968          3 Sheets-Sheet 3

BEARING RACE CONCENTRICITY

INVENTOR
JOHN J. DI PONIO
BY
ATTORNEYS

United States Patent Office 3,528,271
Patented Sept. 15, 1970

3,528,271
METHOD FOR ROLLING A RACE FOR A BALL BEARING
John J. Di Ponio, Union Lake, Mich., assignor to Ford Motor Company, Dearborn, Mich., a corporation of Delaware
Filed Feb. 2, 1968, Ser. No. 702,682
Int. Cl. B21h *1/12*
U.S. Cl. 72—108                                      2 Claims

ABSTRACT OF THE DISCLOSURE

This specification describes a method for cold rolling a ball bearing race for a ball bearing assembly. The race is formed from a piece of bar stock or tubing and is cold rolled by rolling dies that are fed into the workpiece under pressure at a controlled rate and for a controlled dwell time to produce the annular trackway with which the ball bearings register after assembly. It describes also the characteristics of the rolling die that are necessary in carrying out the cold rolling method steps.

GENERAL DESCRIPTION OF THE INVENTION

My invention comprises a method for pressure-forming a race for a ball bearing. It comprises also rolling dies having special geometric characteristics capable of being used in the cold rolling operation.

It is common practice in the art of manufacturing ball bearings to machine by conventional cutting tools the two annular races or trackways. This involves precision machining and a relatively high manufacturing cost.

My present invention comprises a method for eliminating such time-consuming and costly machining operations. In practicing my invention, I use either solid or tubular stock of circular cross section and cut it to the desired length. The stock is mounted between two rolling dies with its center of rotation situated on a line connecting the centers of the die. The dies are journalled for rotation about parallel axes, and the center distance between the dies may be closed by exerting thereon a feed pressure. The dies are formed with a strategic peripheral geometry that will allow the metal to flow from the periphery of the workpiece in a desired pattern to produce a bearing groove of precision dimensions. As it does this, the dies work harden the steel and provide a grain flow pattern in the periphery of the stock that will contribute to optimum bearing life.

A relatively constant rolling pressure is used and the dwell time following the in-feed of the dies is controlled to provide optimum concentricity.

The cold rolling variables are chosen so that minimum tolerance is achieved in the finished bearing race. The flow of the metal during the rolling operation, because of the precalibrated geometry of the dies and the workpiece itself, is such that the characteristic dimensions of the workpiece do not deviate from pre-established limits.

BRIEF DESCRIPTION OF THE FIGURES OF THE DRAWING

FIG. 1 shows an end elevation view of the bearing assembly, which may include the improved, rolled inner bearing race manufactured by the rolling method of my invention.

FIG. 2 is a cross-sectional view taken along the plane of section line 2—2 of FIG. 1.

FIG. 3 is a side elevation view, partly in section, showing a piece of tubular bar stock used in the manufacture of an inner bearing race.

FIG. 4 shows a workpiece which is cut from the bar stock of FIG. 3.

FIG. 5 is a schematic assembly view of a pair of rolling dies situated in rolling engagement with the workpiece of FIG. 4 as the latter is mounted for rotation about an axis parallel to the axis of the dies.

FIG. 6 is a cross-sectional view of the workpiece of FIG. 4, following rolling, as seen from the plane of section line 6—6 of FIG. 5.

FIG. 6a illustrates a bearing race formed by prior art methods.

FIG. 7 shows in transverse, cross-sectional form a rolling die used in forming the race of FIG. 6.

FIG. 8 is a side elevation view of a rolled bearing race for use in the assembly of FIG. 1.

FIG. 9 is a longitudinal, cross-sectional view of a rolling die capable of rolling, together with a companion rolling die, the race of FIG. 8. FIG. 9 shows in cross-sectional, schematic form the mode of registry of the rolling die with the workpiece of FIG. 4 to form the race of FIG. 8.

FIG. 10 is a chart that illustrates the effect of cold working on the bar steel used during the rolling operation. The constituency of the metal itself, which may be typical of the metals used during the formation of bearing races, also is indicated in FIG. 10.

FIG. 12 shows in longitudinal cross-sectional form a bearing race blank used in forming the bearing race of FIG. 8.

PARTICULAR DESCRIPTION OF THE INVENTION

Figure 11A:
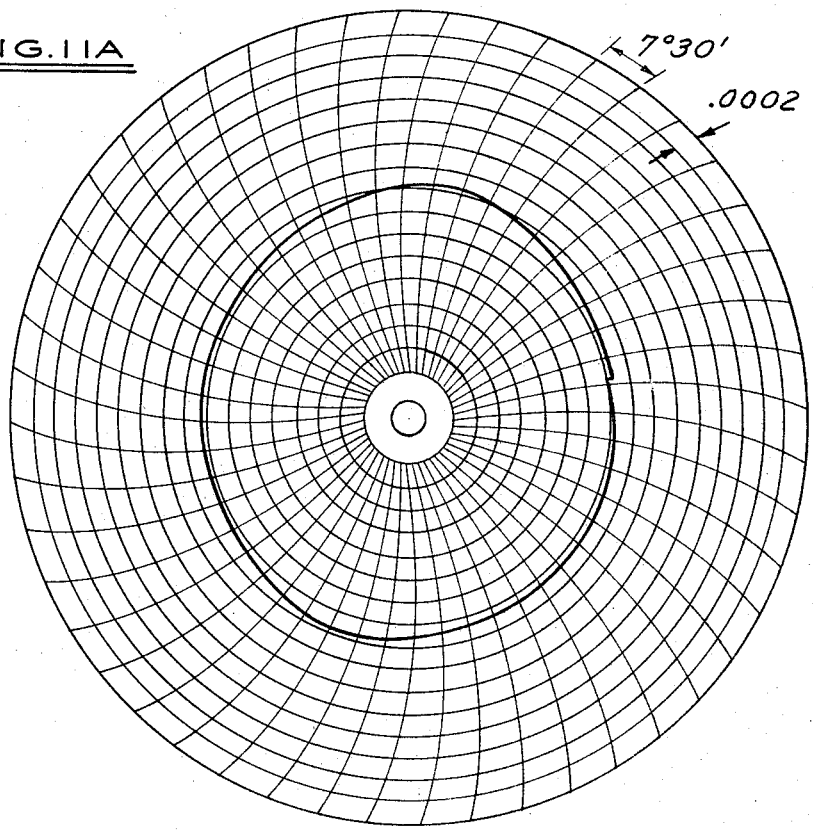
FIGURE 11A shows a polar chart of the deviations in outside diameter of the inner bearing race shown in FIG. 8 following a rolling operation.
Figure 11B:
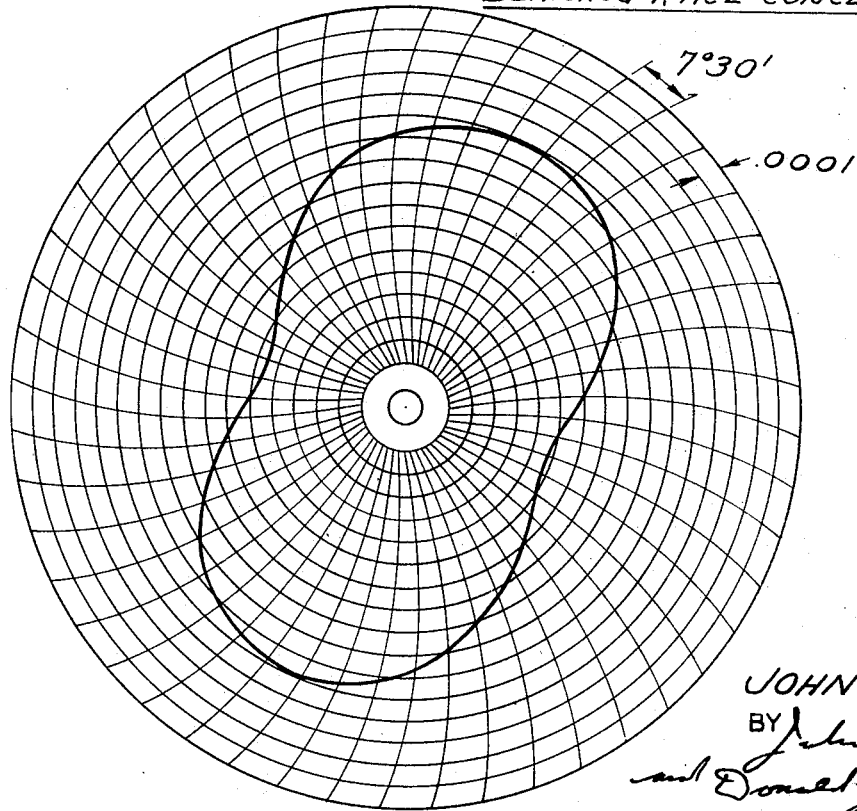
FIG. 11B shows a chart similar to the one illustrated in FIG. 11A, although it designates an out-of-roundness condition that is apparent when proper roller-die feeding rates are not used.

In FIG. 1 numeral 10 designates the outer race of a ball bearing 12. The bearing includes an inner race 14, which is formed with a concave periphery 16. The outer race 10 also is formed with a groove 18, which is situated in juxtaposition with respect to the concavity of groove 16 in the race 14. Located between the races 10 and 14 is a series of bearing balls 20 that are held in peripherally spaced relationship with respect to each other by means of a ball bearing cage 22.

The improved rolling dies and the method disclosed here relates to the manufacture of the inner race 14.

In forming the inner race 14, I use a piece of tubular stock shown in FIG. 3 at 24. It includes a hollow interior having an inner diameter, as indicated at 26. The wall thickness for the tube 24 can be chosen so that the desired bearing race thickness is obtained in the final product. The material of which the tube stock is formed, by preference, is bearing steel such as SAE 52100 steel. This comprises the following constituents:

|  | Percent |
|---|---|
| Carbon | 95 to 1.0 |
| Manganese MN | .25 to .45 |
| Chromium CR | 1.30 to 1.60 |

The tube of FIG. 3 is cut into lengths, as indicated in FIG. 4. Each segment forms a workpiece 28. By preference the workpiece 28 is chamfered, as shown at 29 in FIG. 12, although under some design conditions the chamfer is not required. The outer surface shown at 32 in FIG. 12 is a cylindrical surface, as is the surface of the inner opening 26.

The workpiece shown at 28 in FIGS. 4 and 12 is mounted on an arbor for rotation about an axis 30, as seen in FIG. 5. The pair of dies 32 and 34 is situated, as shown in FIG. 5, with the axis of each die parallel to and spaced from the axis 30.

The center distance between the dies 32 and 34 is closed as the dies are brought together under influence of hydraulic pressure. The dies can be mounted for this purpose in a hydraulic press. The dies are fed toward the workpiece at a rate of approximately .023" per revolution as the dies are rotated at a speed of approximately 105 r.p.m. The dies themselves may be formed of high carbon steel of a hardness of approximately 63 Rockwell C.

The contour of the periphery of the dies is illustrated best in FIG. 7 where I have shown die 23 in end elevation. The outer surface 36 of the die 32 is of cylindrical form. Its mid-section is provided with an annular ring of circular cross-section, and radius $R_2$ as shown at 38. The root of the ring 38 forms a radius $R_1$ as shown at 40. If the die is used in rolling a bearing race having approximately 1.5" on its inside diameter, the radius $R_1$ at the root 40 should be .120" to .180". The radial thickness of the die 32 is sufficiently great to avoid distortion of the die in a radial direction during the rolling operation.

As indicated in FIG. 9, the die, as it is fed toward the workpiece, displaces metal from the center of the workpiece in each axial direction. This results in the flow pattern indicated in FIGS. 6 and 9.

Initially a slight amount of bending will occur in the workpiece during the rolling operation as the dies are fed into the workpiece. The center of the workpiece will tend to bend or deform radially inwardly, and the edges of the workpiece will tend to move outwardly axially. As the dies continue their feeding motion toward the position shown in FIG. 9, the metal that is displaced from the center section of the workpiece compensates for the normal tendency of the workpiece to deform radially. At the same time the edges of the workpiece, which may be modified as shown at 29 in FIG. 12, tend to become restored to the approximate position shown in FIG. 6. The inside diameter at any axial position along the workpiece thus is held to a precise value. There is no severe tendency for the workpiece to become bulged inwardly in the region directly inward from the rolled peripheral groove in the finished inner race.

In rolling an inner race formed with 52100 steel and having a diameter of approximately 1.5", a rolling pressure of 12,000 to 13,000 lbs. is recommended.

The dies are fed toward the workpiece, and upon reaching the full rolling depth, a dwell of approximately one to two seconds occurs to permit the workpiece to make approximately two revolutions. This improves the concentricity sufficiently so that precise diametrical tolerances can be maintained. In FIG. 11A I have illustrated a checking trace obtained for a workpiece that was rolled with a dwell of approximately two seconds. The diameter of the inside diameter of the workpiece was 1.50" and the outside diameter was 2.035". Each radially displaced reference line in the chart of FIG. 11A represents .00025". A high degree of concentricity is represented by the circular configuration of the trace obtained with the chart of FIG. 11A.

In contrast with the chart of 11A, the chart of 11B shows a checking trace for a rolled outside diameter for a workpiece that underwent a single revolution. The outside diameter assumed a double elliptical configuration with all other parameters remaining the same as those in preparing the chart of 11A.

As the metal is displaced from the periphery of the workpiece, a grain pattern is established that results in a high degree of work hardening. The resulting hardness of 52100 steel is approximately 25 to 32 Rockwell C hardness. A chart showing the relationship between the hardness, the tensile strength, the yield strength and the amount of cold working is indicated in FIG. 10.

If it is deemed to be necessary in any particular rolling operation, the workpiece can be provided with a pre-rolled or pre-machined outer periphery at the central region thereby assisting in locating the die at the precise location on the workpiece. This can be done as a pre-rolling procedure on a separate set of rolling dies. The purpose simply would be to register the axial position of the final rolling dies during the rolling operation at a predetermined location. Where the axial position of the rolling dies can be determined by precisely gauging its distance from the side of the workpiece, the pre-rolling step is not required.

Having described a preferred form of my invention, what I claim and desire to secure by U.S. Letters Patent is:

1. A method for rolling an annular ball bearing race from a cylindrical workpiece comprising the steps of forming a pair of rolling dies of cylindrical shape, each die having an outer peripheral surface that is substantially cylindrical, forming on each peripheral surface an annular ring of curvilinear cross-section, a generous fillet radius at the root of said ring on each axial side thereof, the magnitude of said radius being approximately .100" to .180", the axis of said workpiece and the axis of each die being situated in a common plane, feeding said dies toward said workpiece at a controlled rate whereby the ring on the periphery of each die displaces metal from the outer periphery of said workpiece to form a geometrically precise groove for accommodating the balls of a ball bearing, the metal displaced from the region of said groove flowing in a generally axial direction as it is directed by each of the roots of said rings, and maintaining said dies at the full rolling depth for a dwell time sufficient to permit approximately two revolutions of said workpiece, said rings being adapted to displace metal from said workpiece as the center distance between said workpiece and said die is closed, the metal flowing from the region of the annular grove thus formed on said workpiece toward each axial side thereof, each ring having a root radius that blends the periphery of said ring with the cylindrical surface of said die thereby resulting in an absence of sharp discontinuities in the die surface profile.

2. The bearing race rolling method as described in claim 1 wherein said rolling dies exert a rolling pressure on said workpiece that is maintained at a relatively constant value as the dies are fed toward each other upon closing the center distance between said dies.

References Cited

UNITED STATES PATENTS 3,230,606   1/1966   Tadashi Saito et al. __ 29—148.4

LOWELL A. LARSON, Primary Examiner

U.S. Cl. X.R.

29—148.8